United States Patent
Seely et al.

(10) Patent No.: US 10,620,599 B2
(45) Date of Patent: Apr. 14, 2020

(54) DISTRIBUTED FINITE STATE MACHINE CONFIGURATION FOR CONTROLLING A PHYSICAL ASSET

(71) Applicant: General Electric Company, Schenectady, NY (US)

(72) Inventors: William Forrester Seely, Greenville, SC (US); John Raffensperger, Greenville, SC (US); Karl Minto, Greenville, SC (US)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 15/862,367

(22) Filed: Jan. 4, 2018

(65) Prior Publication Data

US 2019/0204802 A1 Jul. 4, 2019

(51) Int. Cl.
*G05B 19/042* (2006.01)
*G06F 9/448* (2018.01)
(Continued)

(52) U.S. Cl.
CPC ........... *G05B 19/0421* (2013.01); *G05B 9/03* (2013.01); *G05B 19/045* (2013.01); *G05B 23/0291* (2013.01); *G06F 9/4498* (2018.02); *G05B 2219/2231* (2013.01); *G05B 2219/23289* (2013.01); *G05B 2219/24177* (2013.01); *G05B 2219/25484* (2013.01); *G05B 2219/33343* (2013.01)

(58) Field of Classification Search
None
See application file for complete search history.

(56) References Cited

U.S. PATENT DOCUMENTS 3,875,384 A 4/1975 Davis
5,099,411 A 3/1992 Blotenberg et al.
(Continued)

OTHER PUBLICATIONS

European Search Report for EP Application No. 18215297.5-1204 dated Jun. 4, 2019, 10 pages.
(Continued)

*Primary Examiner* — Sean Shechtman
(74) *Attorney, Agent, or Firm* — Eversheds Sutherland (US) LLP

(57) ABSTRACT

Exemplary embodiments pertain to a system that can include a high-level controller coupled to a low-level controller for controlling a physical asset. In one exemplary implementation, the high-level controller executes a first finite state machine for controlling a power generation unit via a network. The low-level controller executes a second finite state machine that may have fewer states than the first finite state machine. The second finite state machine places the low-level controller in a default mode of operation for controlling the power generation unit under various conditions such as when the high-level controller is controlling the physical asset during a normal mode of operation; when the high-level controller is revising the first finite state machine; when the high-level controller is controlling the physical asset using a revised first finite state machine; and/or upon detecting a loss of communications between the high-level controller and the low-level controller.

20 Claims, 7 Drawing Sheets

(51) Int. Cl.
*G05B 19/045* (2006.01)
*G05B 23/02* (2006.01)
*G05B 9/03* (2006.01)

(56) References Cited

U.S. PATENT DOCUMENTS

2012/0020786 A1* 1/2012 Ayres .................. F03D 7/047
 416/1
2013/0035772 A1* 2/2013 Pearson ................ G05B 9/03
 700/20

OTHER PUBLICATIONS

Extended Search Report of EP 182152975, dated Jun. 4, 2019 (10 pp.).

* cited by examiner

DISTRIBUTED FINITE STATE MACHINE CONFIGURATION FOR CONTROLLING A PHYSICAL ASSET

FIELD OF THE DISCLOSURE

This disclosure generally relates to controlling a physical asset, and more particularly, to using a distributed finite machine configuration for controlling a physical asset such as a power generation unit.

BACKGROUND OF THE DISCLOSURE

Electric power is typically generated in a power plant by using one or more power generation units. A typical power generation unit can include a compressor that provides pressurized air to a combustor where the pressurized air is mixed with fuel and ignited for producing hot combustion gases. The hot combustion gases flow downstream from the combustor and into a turbine where energy is extracted from the hot combustion gases in order to rotate rotor blades that are attached to a shaft. The rotation of the shaft can be used to generate electricity in an electric generator and the generated electricity coupled into an electric grid for distribution to customers.

Interruption in the distribution of electricity to customers, particularly any interruption as a result of a malfunction or poor performance of the power generation unit, can be expensive and frustrating for customers. Consequently, significant efforts are typically taken to improve reliability and efficiency in the power generation unit as well as in a controller that controls the power generation unit. Towards this end, the hardware and the software used in the controller is often tailored more towards robustness than towards providing an extensive array of features and controls. Nonetheless, it may be desirable at times to replace, upgrade, or repair, some of the existing software in a controller for various reasons. At least some conventional solutions entail stopping of normal operations of the controller in order to do so, thus introducing various risks such as for example, a malfunctioning of the power generation unit or sub-optimal performance of the power generation unit while the controller is offline.

BRIEF DESCRIPTION OF THE DISCLOSURE

Embodiments of the disclosure are directed generally to systems and methods incorporating multi-level controllers that cooperate with each other to execute a distributed finite state machine configuration allows continuous control of a power generation unit.

According to one exemplary embodiment of the disclosure, a system can include a high-level controller and a low-level controller. The high-level controller is in communication with a physical asset via a network through a network connection and is configured to execute a first finite state machine for controlling the physical asset during a normal mode of operation. The low-level controller is configured to execute a second finite state machine for controlling the physical asset during a default mode of operation, the second finite state machine configured to place the low-level controller in the default mode of operation upon detecting a loss of communications between the high-level controller and the low-level controller.

According to one exemplary embodiment of the disclosure, a method can include utilizing a high-level controller to execute a first finite state machine for controlling a physical asset during a normal mode of operation. The method can also include utilizing a low-level controller that is configured to execute a second finite state machine for controlling the physical asset during a default mode of operation; detecting a loss of communication between the high-level controller and the low-level controller; and placing the low-level controller in the default mode of operation upon detecting the loss of communication between the high-level controller and the low-level controller.

According to yet another exemplary embodiment of the disclosure, a method can include utilizing a high-level controller configured to execute a first finite state machine for placing a physical asset in one of a first set of operational states; providing a low-level controller comprising a second finite state machine that is executable for placing the physical asset in one of a second set of operational states that is smaller than the first set of operational states; detecting a loss of communication between the high-level controller and the low-level controller; and executing the second finite state machine for placing the physical asset in the one of the second set of operational states upon detecting the loss of communication between the high-level controller and the low-level controller.

Other embodiments and aspects of the disclosure will become apparent from the following description taken in conjunction with the following drawings.

BRIEF DESCRIPTION OF THE DRAWINGS

Figure 1:
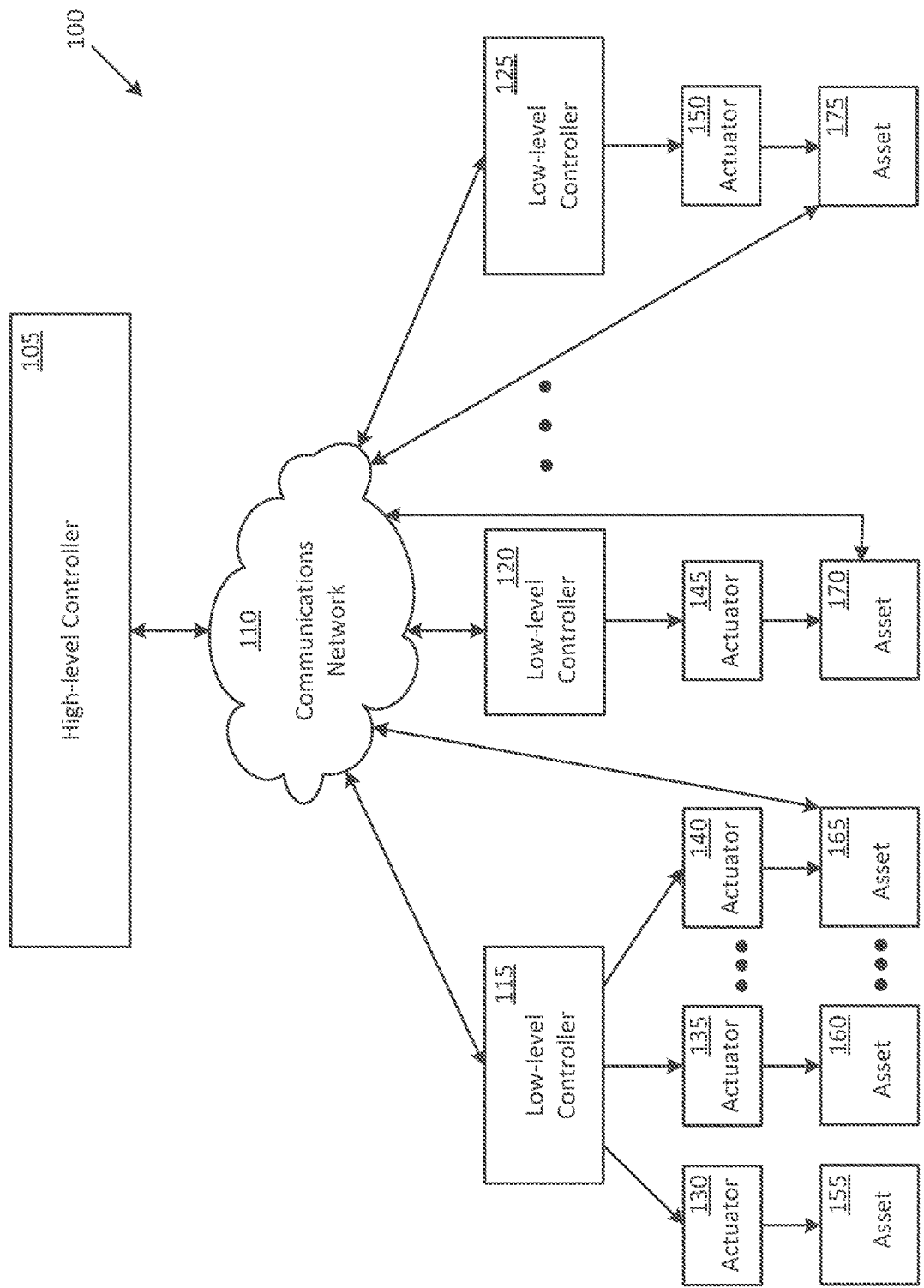

Having thus described the disclosure in general terms, reference will now be made to the accompanying drawings, which are not necessarily drawn to scale, and wherein:

FIG. 1 illustrates an exemplary system that uses multi-level controllers for controlling one or more physical assets in accordance with an exemplary embodiment of the disclosure.

Figure 2:
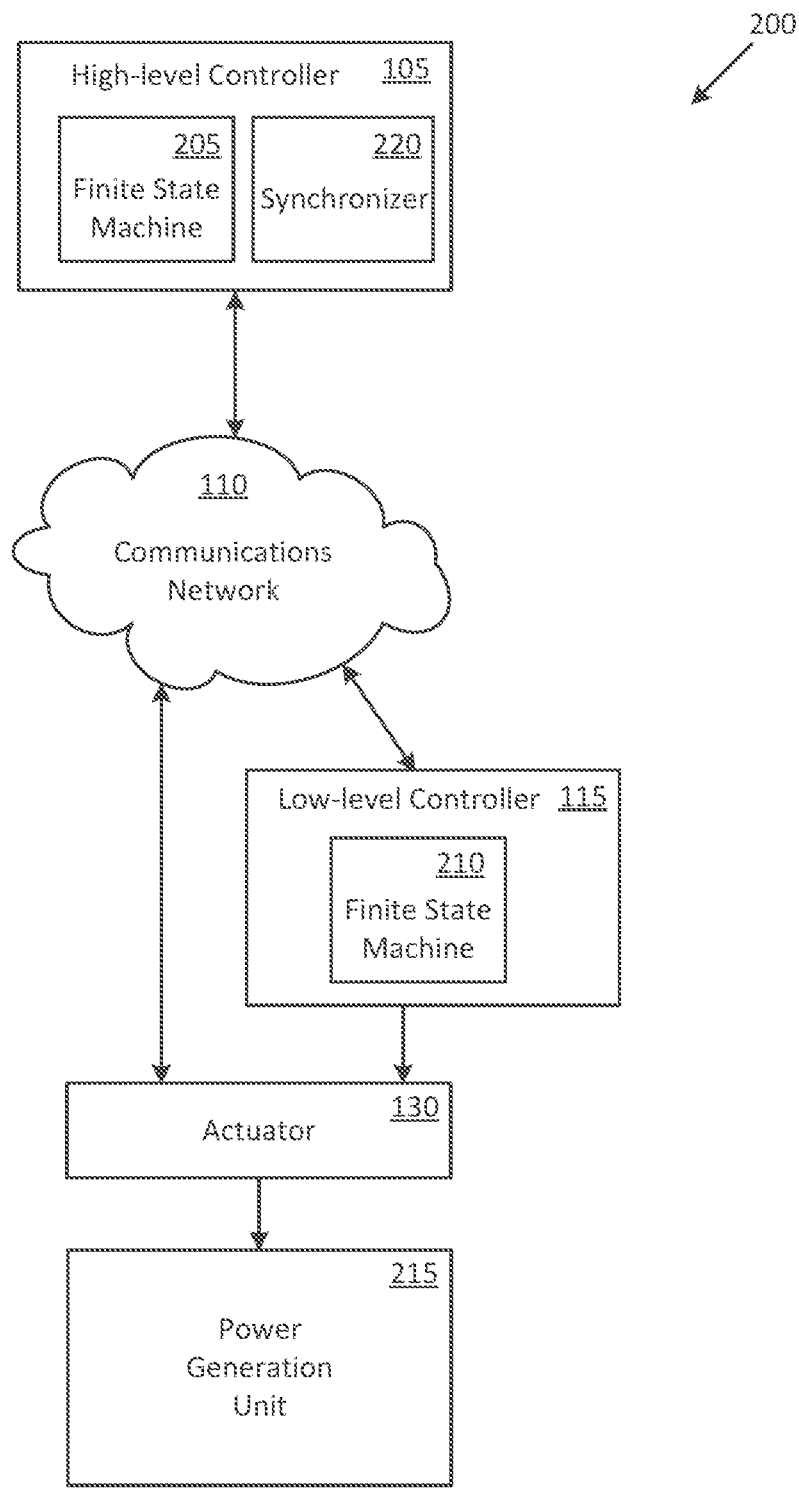

FIG. 2 illustrates some exemplary multi-level controllers that utilize a distributed finite state machine configuration for controlling a power generation unit in accordance with an exemplary embodiment of the disclosure.

Figure 3:
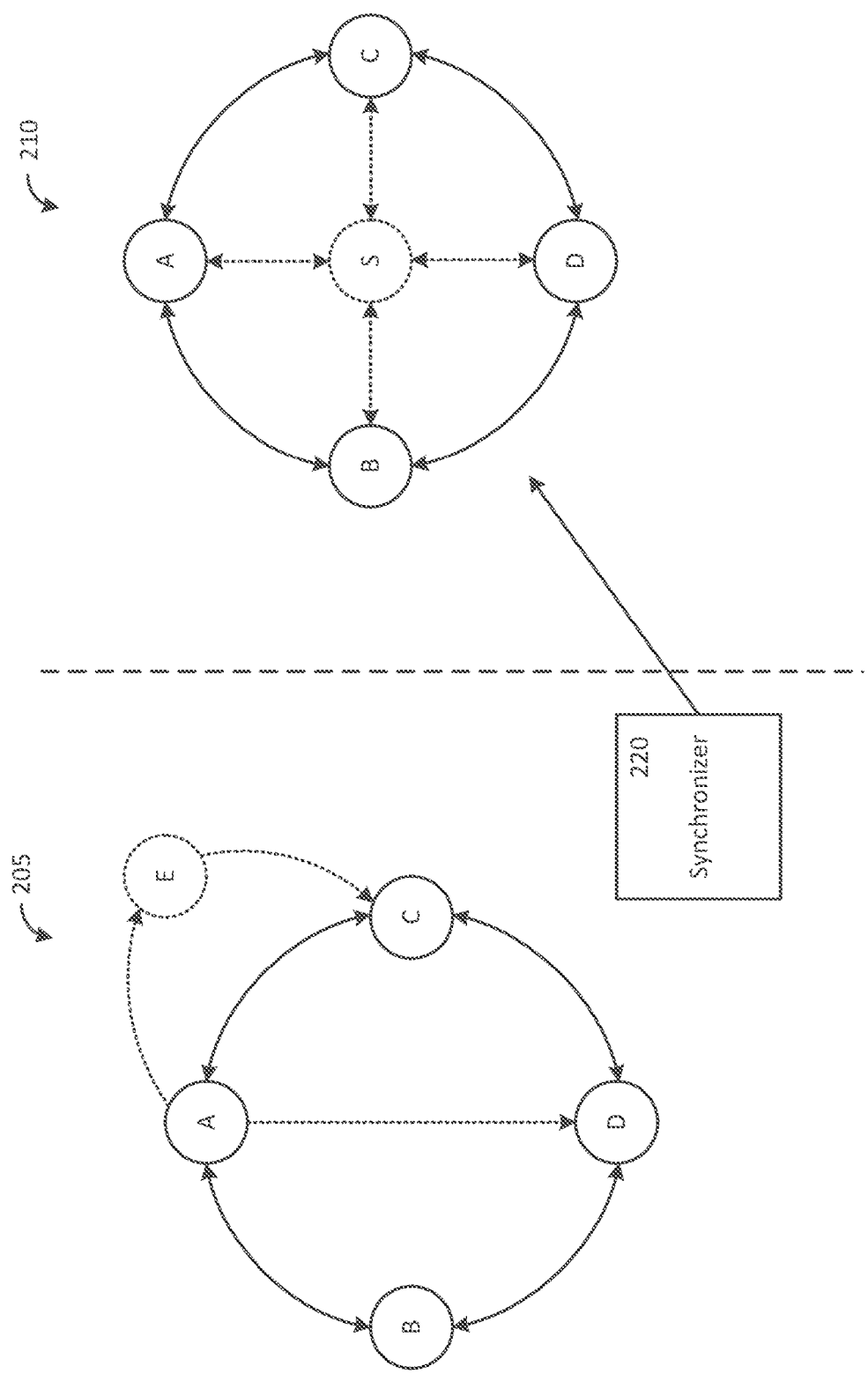

FIG. 3 shows a pair of exemplary finite state machines that can be a part of the distributed finite state machine configuration illustrated in FIG. 2.

Figure 4:
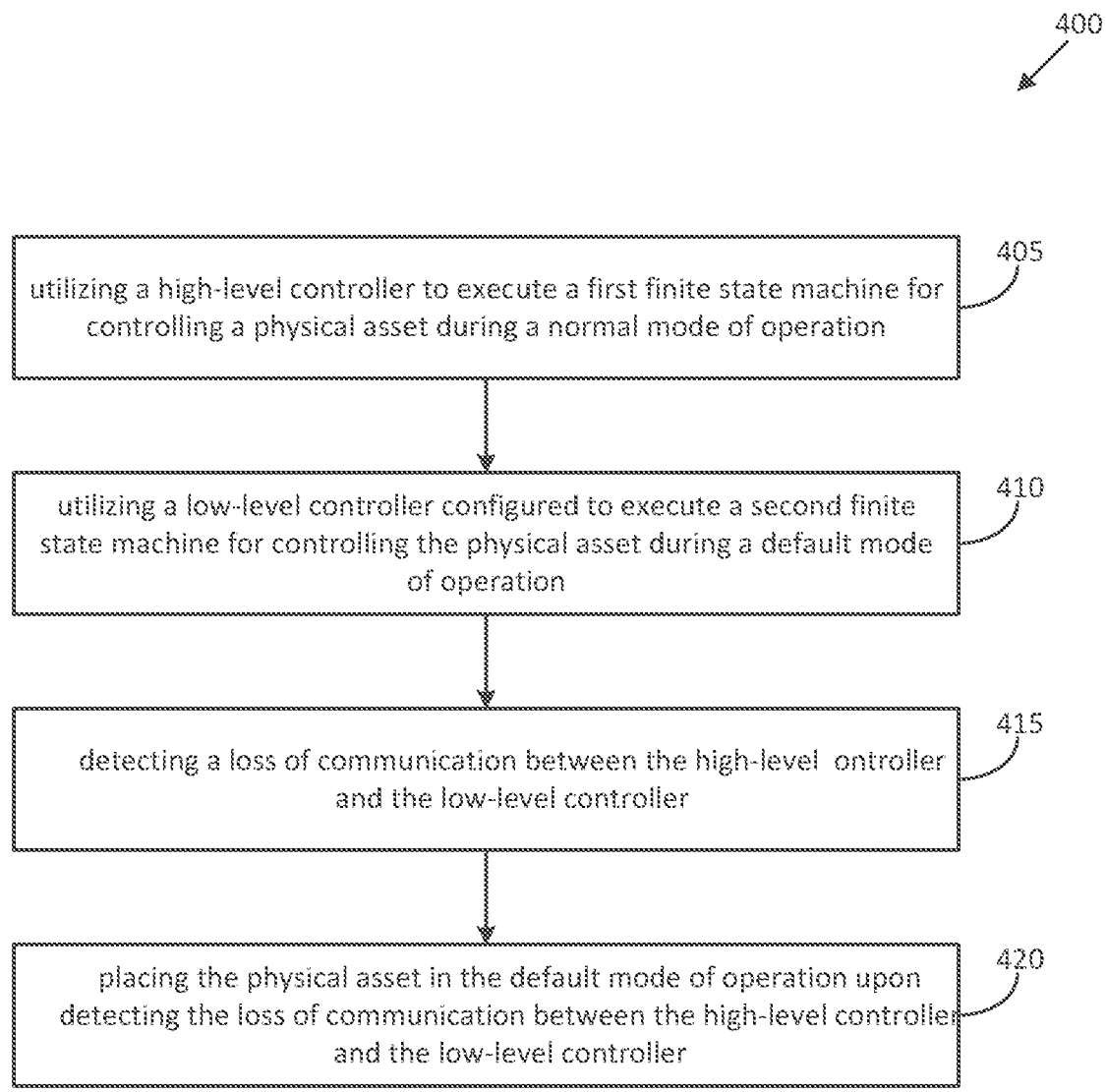

FIG. 4 shows a first exemplary flowchart of a method of utilizing the pair of finite state machines shown in FIG. 3.

Figure 5:
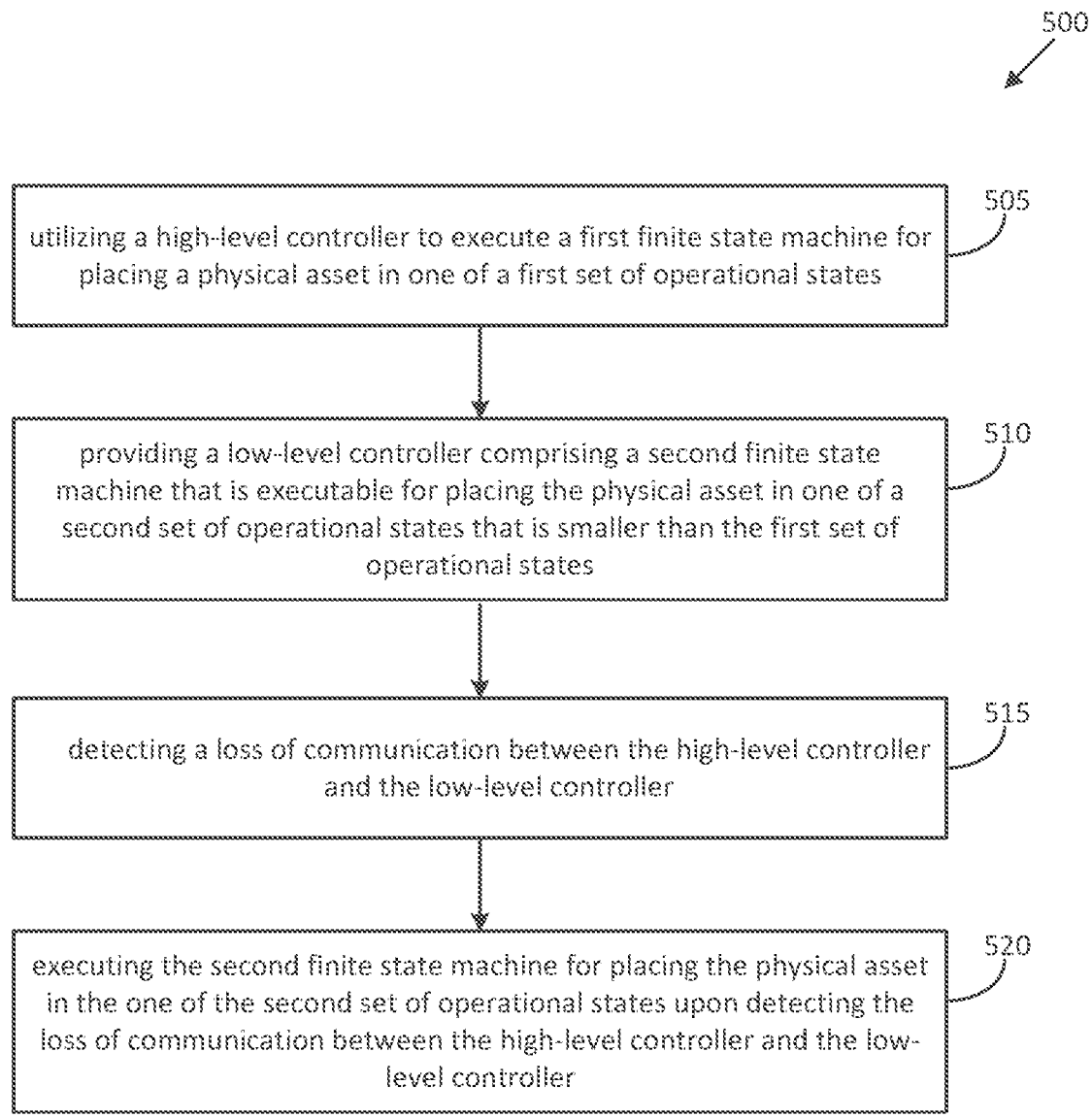

FIG. 5 shows a second exemplary flowchart of a method of utilizing the pair of finite state machines shown in FIG. 3.

Figure 6:
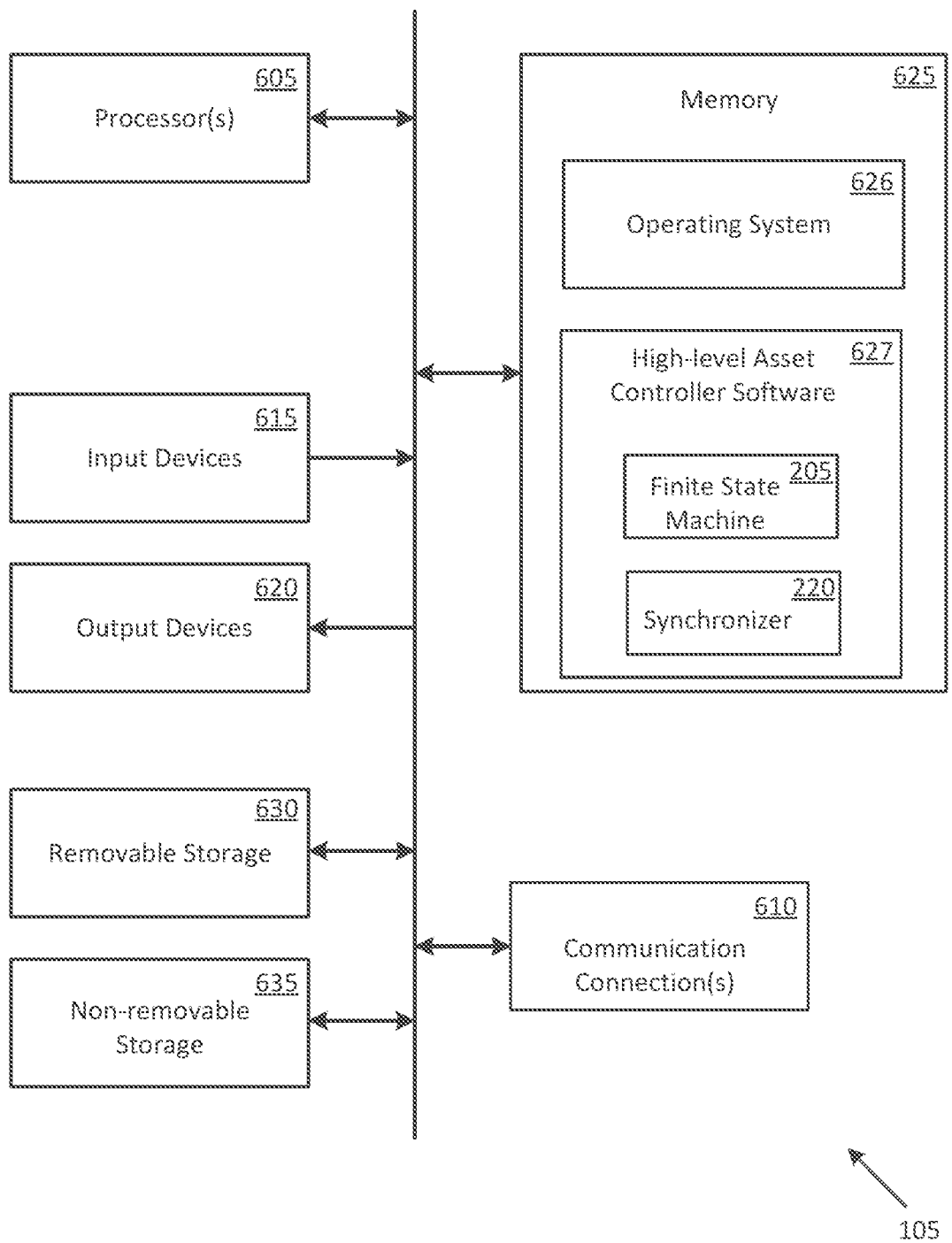

FIG. 6 illustrates some exemplary elements that can be included in a computer configured to execute a first exemplary finite state machine in accordance with an exemplary embodiment of the disclosure.

Figure 7:
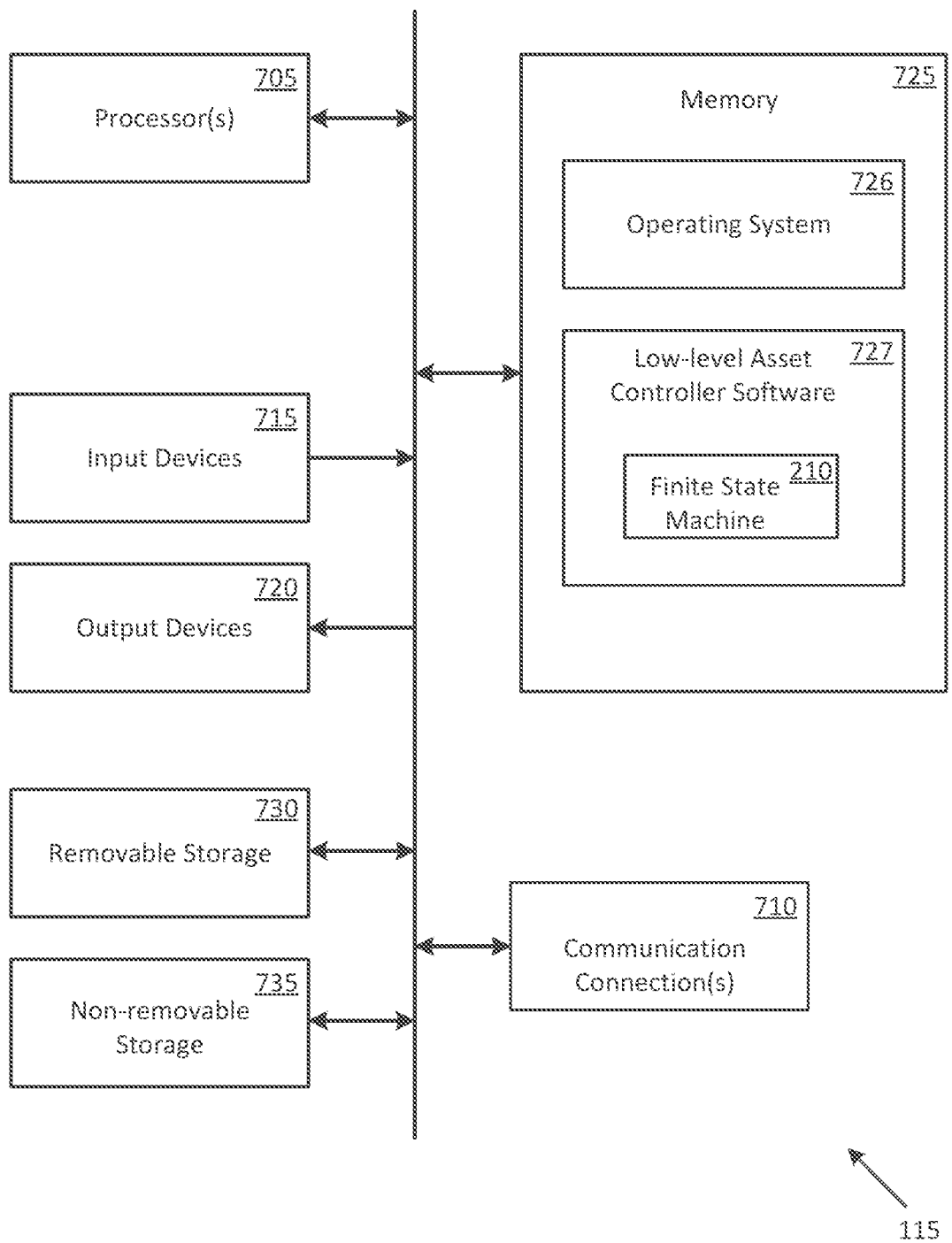

FIG. 7 illustrates some exemplary elements that can be included in a computer configured to execute a second exemplary finite state machine in accordance with an exemplary embodiment of the disclosure.

The disclosure will be described more fully hereinafter with reference to the drawings, in which exemplary embodiments of the disclosure are shown. This disclosure may, however, be embodied in many different forms and should not be construed as limited to the exemplary embodiments set forth herein; rather, these embodiments are provided so that this disclosure will satisfy applicable legal requirements. Like numbers refer to like elements throughout. It should be understood that certain words and terms are used herein solely for convenience and such words and terms should be interpreted as referring to various objects and actions that are generally understood in various forms and equivalencies by persons of ordinary skill in the art. Furthermore, the word "example" as used herein is intended to be non-exclusionary and non-limiting in nature. More particularly, the word "exemplary" as used herein indicates one among several examples, and it should be understood that no undue emphasis or preference is being directed to the particular example being described.

DETAILED DESCRIPTION

In terms of a general overview, certain embodiments described in this disclosure pertain to a system having a high-level controller that can be coupled to one or more low-level controllers in an arrangement that allows the high-level controller to cooperate with the low-level controller for controlling a physical asset such as a power generation unit. In one exemplary implementation, the high-level controller executes a first finite state machine for controlling a power generation unit via a network during a normal mode of operation. The low-level controller executes a second finite state machine that may have fewer states than the first finite state machine. The second finite state machine places the low-level controller in a default mode of operation under one or more of various conditions. Some examples of these various conditions are: when the high-level controller is controlling the physical asset during the normal mode of operation; when the high-level controller is revising the first finite state machine; when the high-level controller is controlling the physical asset by utilizing a revised first finite state machine; and/or upon detecting a loss of communications between the high-level controller and the low-level controller.

Attention is now drawn to FIG. 1, which illustrates an exemplary system 100 that provides for using a multi-level controller system having a distributed finite state machine configuration for controlling one or more of physical assets in accordance with an exemplary embodiment of the disclosure. The exemplary system 100 can include a high-level controller 105 that is communicatively coupled to one or more of low-level controllers, such as a first low-level controller 115, a second low-level controller 120, and an "$n^{th}$" low-level controller 125 (n>1). In another implementation, the high-level controller 105 can be communicatively coupled to a single low-level controller. Each of the low-level controllers can be coupled to one or more actuators that actuate one or more controls (such as a temperature control, a fuel-feed control etc.) of an associated physical asset. In one example implementation, each of a first physical asset 155, a second physical asset 160, and an "$n^{th}$" physical asset 175 (n>1) is a power generation unit. The description hereon refers to the first low-level controller 115 and the physical asset 165 but it should be understood that the description applies equally well to the other low-level controllers and assets. Furthermore, the physical asset 165 may be referred to in some instances as a power generation unit, which is one example of a physical asset that can be operated upon in accordance with various exemplary embodiments of the disclosure.

The communications network 110 used to provide the communicative coupling between the high-level controller 105 and the one or more low-level controllers can be any one or more of various types of networks such as the Internet, a private wide-area network (WAN), or a private local area network (LAN). The communications network 110 can also be used to provide the communicative coupling between the high-level controller 105 and one or more of the "n" physical assets.

In accordance with the exemplary embodiment shown in FIG. 1, the high-level controller 105 can be a server computer configured to execute one or more software programs for controlling the various assets via the communications network 110. An exemplary software program incorporates a first finite state machine that can be used to operate the physical asset 165. The high-level controller 105 may allow the first finite state machine to be modified for operating the physical asset 165 in various ways. The modifications may be carried out for various reasons such as for improving the performance of the physical asset 165 based on new developments or studies for example. Consequently, the high-level controller 105 may be taken offline or shut down during the process of modifying the software program incorporating the first finite state machine.

On the other hand, the low-level controller 115 can be a client computer configured to execute one or more software programs. An exemplary software program executed by the low-level controller 115 incorporates a second finite state machine directed at ensuring that the physical asset 165 has a high mean time between failures (MTBF). The low-level controller 115 may include hardware which is highly reliable but may be outdated in some cases. The software may also be outdated. Both the hardware and the software may be selected to prevent the low-level controller 115 from being taken offline or shut down other than in extraordinary circumstances (such as a hardware failure or a natural disaster) so as to avoid malfunctioning of the physical asset 165.

FIG. 2 illustrates an exemplary system 200 that uses a distributed finite state machine configuration to control a power generation unit 215 in accordance with an exemplary embodiment of the disclosure. The exemplary system 200 can include the high-level controller 105 communicatively coupled to the low-level controller 115 via the communications network 110. The low-level controller 115 is communicatively coupled to the actuator 130. The actuator 130, which can be one of several actuators, is communicatively coupled to the power generation unit 215 for controlling various components of the power generation unit 215 in response to commands provided by the low-level controller 115. In one exemplary embodiment, the low-level controller 115 utilizes a software program incorporating the second finite state machine 210 for providing the commands to the actuator 130.

The high-level controller 105 is also communicatively coupled to the actuator 130 via the communications network 110, thereby having the capability to bypass the low-level controller 115. In one exemplary embodiment, the high-level controller 105 utilizes a software program incorporating the first finite state machine 205 for providing commands to the actuator 130. In this configuration, the high-level controller 105 controls the power generation unit 215 during a normal mode of operation. At this time, the low-level controller 115 is configured to yield control to the high-level controller 105 and refrain from providing control signals to the actuator 130. The low-level controller 115 is further configured to detect any failure on the part of the high-level controller 105 when the high-level controller 105 is controlling the power generation unit 215. In one exemplary implementation of failure detection, the high-level controller 105 is configured to transmit a heartbeat signal to the low-level controller 115. The heartbeat signal can be a message or other means of signaling that is transmitted repetitively (for example, every minute) to the low-level controller 115 by a synchronizer 220 in the high-level controller 105. The low-level controller 115 monitors the heartbeat signal and recognizes that the presence of the heartbeat signal is indicative of the high-level controller 105 controlling the power generation unit 215. However, upon detecting a loss of the heartbeat signal, the low-level controller 115 assumes that the high-level controller 105 is no longer controlling the power generation unit 215 and consequently, takes over control of the power generation unit 215 in what can be referred to as a default mode of operation.

The heartbeat signal may be lost for a variety of reasons such as due to a failure or malfunction in the high-level controller 105, failure or malfunction of one or more devices in the communications network 110, or may be intentionally stopped by the high-level controller 105. In one exemplary embodiment, the high-level controller 105 stops transmitting of the heartbeat signal to the low-level controller 115 in order to carry out changes in hardware or software in the high-level controller 105. Changes in the software can include addition and/or deletion of one or more states in the first finite state machine 205.

During the default mode of operation, the low-level controller 115 has to ensure that the software program incorporating the second finite state machine 210 seamlessly assumes control of the power generation unit 215.

FIG. 3 illustrates the first finite state machine 205 and the second finite state machine 210 configured to allow the high-level controller 105 to control the power generation unit 215 during the normal mode of operation and ensure that the low-level controller 115 seamlessly assumes control of the power generation unit 215 during the default mode of operation when the high-level controller 105 is not controlling the power generation unit 215.

In this example configuration, the first finite state machine 205 includes a first set of states for controlling a first number of operational aspects of the power generation unit 215. Each state can represent various control conditions. For example, state A may represent controls and monitoring parameters associated with a first air-fuel mixture provided for operating the power generation unit 215. State B may represent controls and monitoring parameters associated with providing cooling water in the power generation unit 215.

Thus, a transition from state A to state B may take place when the software program determines that a component of the power generation unit 215 is overheating as a result of the first air-fuel mixture provided when in state A. The bidirectional solid lines indicate various other such transitions that may take place between state A, state B, state C, and state D. In this example configuration, the software program incorporating a combination of state A, state B, state C, and state D represents a stable software program that may have been used over a long period of time to control the power generation unit 215.

The software program incorporating the combination of state A, state B, state C, and state D may be mirrored in the second finite state machine 210 that is used by a software program executed in the low-level controller 115. The synchronizer 220 in the high-level controller 105 provides the heartbeat signal to the low-level controller 115 to indicate to the low-level controller 115 that the high-level controller 105 is operating in the normal mode of operation. The synchronizer 220 also provides suitable updates to the low-level controller 115 to ensure that the combination of state A, state B, state C, and state D in the high-level controller 105 is accurately mirrored in the second finite state machine 210.

If the combination of state A, state B, state C, and state D in the first finite state machine 205 is identical to the combination of state A, state B, state C, and state D in the second finite state machine 210, a failure to detect the heartbeat signal in the low-level controller 115 results in the low-level controller 115 seamlessly taking over control of the power generation unit 215 and operating in the default mode of operation.

However, in some cases, the first finite state machine 205 may not be identical to the second finite state machine 210. For example, the software program in the high-level controller 105 may undergo a revision of the first finite state machine 205 for introducing some changes in the manner by which the high-level controller 105 controls the power generation unit 215 and/or for providing control of a second number of operational aspects of the power generation unit 215 that may be larger than the first number of operational aspects controllable by the first finite state machine 205. The changes in the software program in the high-level controller 105 are indicated by dashed lines in the first finite state machine 205.

More particularly, in this example, a new state E has been introduced and a new conditional jump introduced from state A to state D. The new state E may be arrived at from either state A or state C. State E may represent, for example, a control operation for improving an MTBF of the power generation unit 215. A trial execution of the software program incorporating the revised first finite state machine 205 may encounter a failure after transitioning from state A to state E for example. Operations of the power generation unit 215 may be adversely affected if no preventive measures are in place to respond to this failure, because the software program running in the low-level controller 115 may be unable to seamlessly take over control of the power generation unit 215 as a result of lacking state E in the second finite state machine 210. Thus, the power generation unit 215 may be operating in response to state E in the first finite state machine 205, and the second finite state machine 210 may ineffectively and/or improperly attempt to use state A during the default mode of operation.

Such an adverse condition is addressed in accordance with the disclosure by using the synchronizer 220 to provide configuration information to the low-level controller 115 for configuring the second finite state machine 210 to transition from state A or state C to a default state S when the first finite state machine 205 is executing state E. Consequently, when a failure occurs during execution of state E of the first finite state machine 205, the second finite state machine 210 is in the default state S and can transition from the default state S into one of the other states. This operation may be carried out by using sensors (not shown) to identify various operating conditions of the power generation unit 215.

The configuration information provided by the synchronizer 220 to the low-level controller 115 can be carried out on a recurring basis, such as for example, on a periodically repetitive basis (seconds, minutes, hours etc.) or can be carried out on an as-needed basis, for example, prior to carrying out one or more changes upon the first finite state machine 205.

In one example implementation, a failure in the execution of the revised first finite state machine 205 may be detected in the low-level controller 115 by various ways such as by a failure to receive the heartbeat signal, or a failure to receive one or more messages from the high-level controller 105.

FIG. 4 shows an exemplary flowchart of a method 400 of utilizing the first finite state machine 205 cooperatively with the second finite state machine 210 to control a physical asset in accordance with an exemplary embodiment of the disclosure. In block 405, the high-level controller 105 is configured to execute the first finite state machine 205 for controlling a physical asset, such as the power generation unit 215, during a normal mode of operation. In block 410, the low-level controller 115 is configured to execute the second finite state machine 210 for controlling the power generation unit 215 during a default mode of operation. In block 415, a loss of communication is detected between the high-level controller 105 and the low-level controller 115. This operation may be carried out by detecting loss of a heartbeat signal in the low-level controller 115. In block 420, the low-level controller 115 is placed in the default mode of operation upon detecting the loss of communication between the high-level controller 105 and the low-level controller 115.

FIG. 5 shows another exemplary flowchart of a method 500 of utilizing the first finite state machine 205 cooperatively with the second finite state machine 210 to control a physical asset in accordance with an exemplary embodiment of the disclosure. In block 505, the high-level controller 105 is utilized to execute the first finite state machine 205 for placing the power generation unit 215 in one of a first set of operational states. In block 510, the low-level controller 115 that includes the second finite state machine 210 is provided for placing the power generation unit 215 in one of a second set of operational states. The second set of operational states can be smaller than the first set of operational states. In block 515, a loss of communication is detected between the high-level controller 105 and the low-level controller 115. This operation may be carried out by detecting loss of a heartbeat signal in the low-level controller 115. In block 520, the second finite state machine 210 is executed for placing the power generation unit 215 in one of the second set of operational states upon detecting the loss of communication between the high-level controller 105 and the low-level controller 115.

FIG. 6 illustrates some exemplary elements that can be included in a computer configured to execute the high-level controller 105 having the first finite state machine 205 in accordance with an exemplary embodiment of the disclosure. It should be understood that in various exemplary embodiments, the high-level controller 105 may be configured as a server computer. Accordingly, some of the hardware elements described below with reference to FIG. 6 may be omitted and other elements that are typically used for operating a server computer may be used instead.

The high-level controller 105 may include a processor 605 capable of communicating with a memory 625. The processor 605 may be implemented as appropriate in hardware, software, firmware, or combinations thereof. Software or firmware implementations of the processor 605 may include computer-executable or machine-executable instructions written in any suitable programming language to perform the various functions described. In one embodiment, instructions associated with a function block language may be stored in the memory 625 and executed by the processor 605.

The memory 625 may store program instructions that are loadable and executable on the processor 605, as well as data generated during the execution of these programs. Depending on the configuration and type of the high-level controller 105, the memory 625 may be volatile (such as random access memory (RAM)) and/or non-volatile (such as read-only memory (ROM), flash memory, etc.). In some embodiments, the high-level controller 105 may also include additional removable storage 630 and/or non-removable storage 635 including, but not limited to, magnetic storage, optical disks, and/or tape storage. The memory 625 and associated computer-readable media may provide non-volatile storage of computer-readable instructions, data structures, program modules, and other data for the devices. In some implementations, the memory 625 may include multiple different types of memory, such as static random access memory (SRAM), dynamic random access memory (DRAM), or ROM.

The memory 625, removable storage 630, and non-removable storage 635 are all examples of non-transitory computer-readable storage media. Non-transitory computer-readable storage media may include volatile and non-volatile, removable and non-removable media implemented in any method or technology for storage of information such as computer-readable instructions, data structures, program modules or other data. Additional types of non-transitory computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of non-transitory computer-readable media.

The high-level controller 105 may also include one or more communication connections 610 that may allow the high-level controller 105 to communicate with devices or equipment capable of communicating with the high-level controller 105. The connections can be established via various data communication channels or ports, such as USB or COM ports to receive connections for cables connecting a control device to various other devices on a network, such as the communications network 110. In one embodiment, the high-level controller 105 may include Ethernet drivers that enable the high-level controller 105 to communicate with other devices. According to various embodiments, the communication connections 610 may be established via one or more wired and/or wireless connection.

The high-level controller 105 may also include one or more input devices 615, such as a keyboard, mouse, pen, voice input device, and touch input device. The high-level controller 105 may further include one or more output devices 620, such as a display, printer, and speakers.

Turning to the contents of the memory 625, the memory 625 may include, but is not limited to, an operating system (OS) 626 (such as may be used in a server computer) and one or more application programs or services for implementing the features and aspects disclosed herein with reference to the high-level controller 105. Such applications or services may include high-level controller software 627. The high-level controller software 627 may include the finite state machine 205 and the synchronizer 220 executable by the processor 605 for providing functionalities described herein.

FIG. 7 illustrates some exemplary elements that can be included in a computer configured to execute the high-level controller 105 having the first finite state machine 205 in accordance with an exemplary embodiment of the disclosure.

The processor 705, input devices 715, output devices 720, removable storage 730, and non-removable storage 735, and communication connection(s) 710 that are shown in FIG. 7 are identical or substantially similar to corresponding elements shown in FIG. 6 and described above. Consequently, these elements will not be described here. However, attention is drawn to the memory 725 that may be a part of the computer configured to operate as the low-level controller 115. The memory 725 may include, but is not limited to, an operating system (OS) 726 (such as may be used in a client computer) and one or more application programs or services for implementing the features and aspects disclosed herein with reference to the low-level controller 115. Such applications or services may include the second finite state machine 210 that is executable by the processor 705 for providing functionalities described herein.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the exemplary embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A system comprising:
    a high-level controller in communication with a physical asset via a network through a network connection, the high-level controller configured to execute a first finite state machine for controlling the physical asset during a normal mode of operation; and
    a low-level controller configured to execute a second finite state machine, wherein the second finite state machine is non-identical to the first finite state machine, for controlling the physical asset during a default mode of operation, the second finite state machine configured to place the low-level controller in the default mode of operation upon detecting failure of the high-level controller and a loss of communications between the high-level controller and the low-level controller;
    a first set of states within the first finite state machine, the first set of states associated with a first air-fuel mixture; and
    a second set of states within the second finite state machine, the second set of states associated with cooling water in a power generation unit.

2. The system of claim 1, wherein the high-level controller includes a synchronizer that provides a heartbeat signal to the second finite state machine via the network, the heartbeat signal indicative of the high-level controller controlling the physical asset during the normal mode of operation.

3. The system of claim 2, wherein the low-level controller is configured to revert to a default state of the second finite state machine during at least one of:
    when the high-level controller is controlling the physical asset during the normal mode of operation,
    when the high-level controller is revising the first finite state machine,
    when the high-level controller is controlling the physical asset by utilizing a revised first finite state machine, or upon failing to detect the heartbeat signal.

4. The system of claim 3, wherein the revised first finite state machine includes at least one state that is not included in the second finite state machine.

5. The system of claim 1, wherein the first finite state machine is configured to control a first number of operational aspects of the physical asset and the second finite state machine is configured to control a second number of operational aspects of the physical asset, the second number of operational aspects smaller than the first number of operational aspects.

6. The system of claim 1, wherein the physical asset is a power generation unit that provides a first level of performance when controlled by the high-level controller using the first finite state machine and provides a second level of performance when controlled by the low-level controller using the second finite state machine, the second level of performance lower than the first level of performance.

7. The system of claim 6, wherein each of the first level of performance and the second level of performance is defined at least in part by one of a mean time between failures (MTBF) of the power generation unit or a power generation output capacity of the power generation unit.

8. A method comprising:
    utilizing a high-level controller to execute a first finite state machine for controlling a physical asset during a normal mode of operation, wherein the first finite state machine comprises a first set of states, the first set of states associated with a first air-fuel mixture;
    utilizing a low-level controller configured to execute a second finite state machine, wherein the second finite state machine is non-identical to the first finite state machine, for controlling the physical asset during a default mode of operation, wherein the second finite state machine comprises a second set of states, the second set of states associated with cooling water in a power generation unit;
    detecting a loss of communication between the high-level controller and the low-level controller; and
    placing the low-level controller in the default mode of operation upon detecting the loss of communication between the high-level controller and the low-level controller.

9. The method of claim 8, wherein detecting the loss of communication between the high-level controller and the low-level controller comprises:
    transmitting a heartbeat signal from the high-level controller to the low-level controller; and
    utilizing the second finite state machine to detect a failure to receive the heartbeat signal in the low-level controller, the failure to receive the heartbeat signal indicative of failure of the high-level controller and the loss of communication between the high-level controller and the low-level controller.

10. The method of claim 8, further comprising:
    providing a first set of states in the first finite state machine;
    providing a second set of states in the second finite state machine, the second set of states including a default state that is used by the low-level controller during the default mode of operation;
    placing the second finite state machine in the default state when the high-level controller is controlling the physical asset during the normal mode of operation;

revising the first set of states in the first finite state machine;

providing to the second finite state machine, an update indicative of a revised first set of states in the first finite state machine; and configuring the second finite state machine to transition into the default state upon detecting the loss of communication between the high-level controller and the low-level controller when the high-level controller is controlling the physical asset by utilizing the revised first set of states.

11. The method of claim 10, further comprising:

transitioning from the default state to one of the second set of states in the second finite state machine used by the low-level controller during the default mode of operation.

12. The method of claim 10, wherein the first set of states is identical to the second set of states and wherein revising the first set of states in the first finite state machine comprises modifying the first finite state machine to include an additional state that is not present in the second set of states.

13. The method of claim 8, wherein each state of the first finite state machine and each state of the second finite state machine is an operational state of a power generation unit.

14. The method of claim 13, wherein the first finite state machine includes at least one state transition that is not present in the second finite state machine.

15. A method comprising:

utilizing a high-level controller configured to execute a first finite state machine for placing a physical asset in one of a first set of operational states associated with a first air-fuel mixture;

providing a low-level controller comprising a second finite state machine, wherein the second finite state machine is non-identical to the first finite state machine, that is executable for placing the physical asset in one of a second set of operational states, associated with cooling water in a power generation unit, that is smaller than the first set of operational states;

detecting a loss of communication between the high-level controller and the low-level controller; and executing the second finite state machine for placing the physical asset in the one of the second set of operational states upon detecting failure of the high-level controller and the loss of communication between the high-level controller and the low-level controller.

16. The method of claim 15, further comprising:

providing a default state in the second finite state machine; and configuring the second finite state machine to transition into the default state upon detecting the loss of communication between the high-level controller and the low-level controller.

17. The method of claim 16, further comprising:

transitioning from the default state to one or more other states in the second finite state machine when executing the second finite state machine upon detecting the loss of communication between the high-level controller and the low-level controller.

18. The method of claim 17, further comprising:

revising the first finite state machine in the high-level controller when the low-level controller is executing the second finite state machine.

19. The method of claim 15, wherein the physical asset is a power generation unit that provides a first level of performance when controlled by the high-level controller using the first finite state machine and provides a second level of performance when controlled by the low-level controller using the second finite state machine.

20. The method of claim 19, wherein each of the first level of performance and the second level of performance is defined at least in part by one of a mean time between failures (MTBF) of the power generation unit or a power generation output capacity of the power generation unit.

* * * * *